United States Patent [19]

Fridman

[11] Patent Number: 5,331,363
[45] Date of Patent: Jul. 19, 1994

[54] PHOTOGRAPHIC CAMERA WITH SWITCHABLE FILM MASKING MECHANISM

[75] Inventor: Vladimir Fridman, New City, N.Y.

[73] Assignee: Concord Camera Corp., Avenel, N.J.

[21] Appl. No.: 24,621

[22] Filed: Mar. 1, 1993

[51] Int. Cl.⁵ .................... G03B 17/02; G03B 37/00
[52] U.S. Cl. ..................................... 354/159; 354/94
[58] Field of Search ............................ 354/94, 159

[56] References Cited

U.S. PATENT DOCUMENTS

| | | | |
|---|---|---|---|
| 5,010,357 | 4/1991 | Misawa | 354/159 |
| 5,066,971 | 11/1991 | Kodaira | 354/465 |
| 5,086,311 | 2/1992 | Naka et al. | 354/195.1 |

Primary Examiner—Michael L. Gellner
Assistant Examiner—Nicholas J. Tuccillo
Attorney, Agent, or Firm—Rogers & Wells

[57] ABSTRACT

The present invention is directed a film masking mechanism for a camera. The film masking mechanism is adapted for switching the camera between a full size picture frame and a panoramic picture frame while using a single roll of film.

8 Claims, 3 Drawing Sheets

PHOTOGRAPHIC CAMERA WITH SWITCHABLE FILM MASKING MECHANISM

BACKGROUND OF THE INVENTION

1. Field of the Invention

The present invention generally relates to a camera having a switchable film masking mechanism. The mechanism herein disclosed allows a camera to change the picture frame size when a picture is taken. Specifically, the present invention discloses a mechanism which changes the picture frame size from a full or normal size to a panoramic size. By providing such a mechanism, cameras may be produced with the capability of taking both a normal picture and a panoramic picture.

2. Description of the Prior Art

Cameras having autofocus capabilities and variable focus lenses are in widespread use. Such cameras can change the focal length for telephotography and wide angle photography without changing the taking lens. In compact cameras and the like, 35 mm roll film is generally used with the picture frame size set at full size (24 mm×35 mm) or half size (24 mm×17.5 mm) for taking these specialized picture sizes.

Some camera designs have utilized a permanent panoramic picture size created by masking upper and lower horizontal portions of a full size frame. Other camera designs have used an insert to change them from taking full size pictures to panoramic pictures. However, the insert could only be inserted or removed at the end of a film roll and could not switched in the middle of a film roll. Recent camera designs have employed a complex interrelation of elements for switching a camera picture size between a full picture and a panoramic picture. Such designs have been disclosed, for example, in U.S. Pat. No. 5,086,311. These complex designs employ two separate spring actuated levers for cutting off the upper and lower horizontal portions of a picture using a scissor-like action. These designs often break down or become locked in one position and have therefore met with only varying degrees of success.

There is therefore a great need in the art for a simple, reliable design which can be employed in a camera for switching a picture size between normal full size and panoramic size and which is also compact and economical to manufacture and sell.

SUMMARY OF THE INVENTION

Accordingly, there is now provided with this invention an improved film masking mechanism effectively overcoming the aforementioned difficulties and long-standing problems inherent in the manufacture of cameras with switchable masking mechanisms. These problems have been solved in a simple, convenient, and highly effective way by providing a mechanism in a camera which can change the picture size from normal and full size to a panoramic size and back again. More particularly, a device is provided which has fewer parts and which is more economical to manufacture than any other device previously disclosed.

According to one aspect of the invention, a camera having a mechanism for switching between a picture of normal or full size and a picture of panoramic size is disclosed. The camera has a rectangular exposure aperture for forming a picture frame of full size. The camera also has a masking means for partially masking the aperture for forming a picture frame of panoramic size. The masking means operates as a unitary element. It is adapted for switching between a first position so that a picture is formed having the full size frame and a second position so that a picture is formed having the panoramic frame size. The camera further comprises an actuating means for pivotably moving the masking means between the first position and the second position.

As will be appreciated by those persons skilled in the art, a major advantage provided by the present invention is a simple method of forming both a full size picture and a panoramic picture on the same roll of film in the camera. It is therefore an object of the invention to provide an economical means of exposing a single roll of film to have both panoramic pictures and full size pictures.

It is another object of the invention to provide a camera which can be selectively positioned between a full size and a panoramic size without changing the film therein.

It is a further object of the invention to provide a camera changeable between a panoramic picture size and a full picture size with a simple construction.

Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

Specific embodiments of the present invention will be described with reference to the following drawings, wherein.

DESCRIPTION OF THE PREFERRED EMBODIMENT

The following preferred embodiment as exemplified by the drawings is illustrative of the invention and is not intended to limit the invention as encompassed by the claims of this application.

Figure 1:
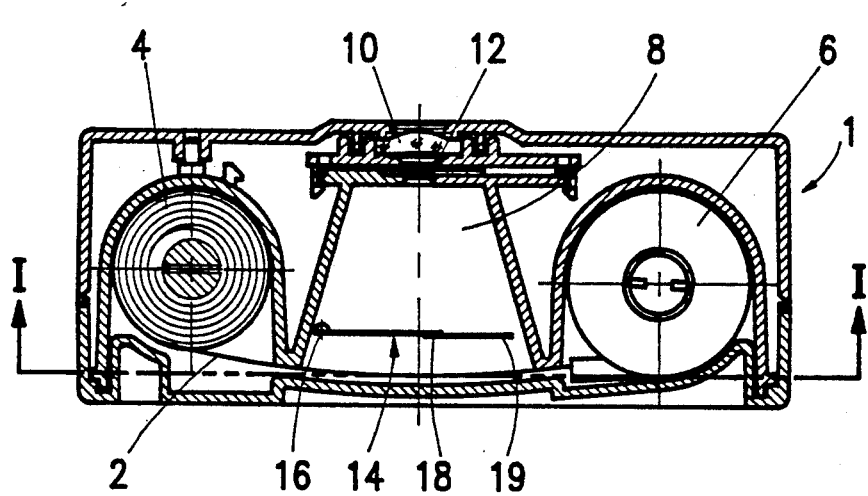
FIG. 1 is a top sectional view of the camera of the present invention showing the masking means in the position for forming panoramic pictures.

In FIG. 1, a top sectional view of the camera 1 of the present invention is illustrated having a roll of film 2 wound from a film roll receiving chamber 4 back into a film patrone chamber 6 one frame at a time. Light enters a film tunnel 8 through a lens 10 and an aperture 12. The aperture 12 is preferentially rectangular for forming a standard rectangular picture exposure on the film. Optionally, the aperture 12 could be any shape and a permanent masking element could be placed downstream of the aperture for exposing the standard rectangular frame upon the film.

A film masking mechanism 14 is positioned in the film tunnel 8 between the aperture 12 and the film 2. The film masking mechanism 14 is attached to the inside body of the camera by means of a pivotal attachment 16. By means of the pivotal attachment 16 of the film masking mechanism 14 to the camera body, the film masking mechanism may be made to swing into and outside of the exposure line of the light 15. This will be described in detail hereinbelow.

Figure 2:
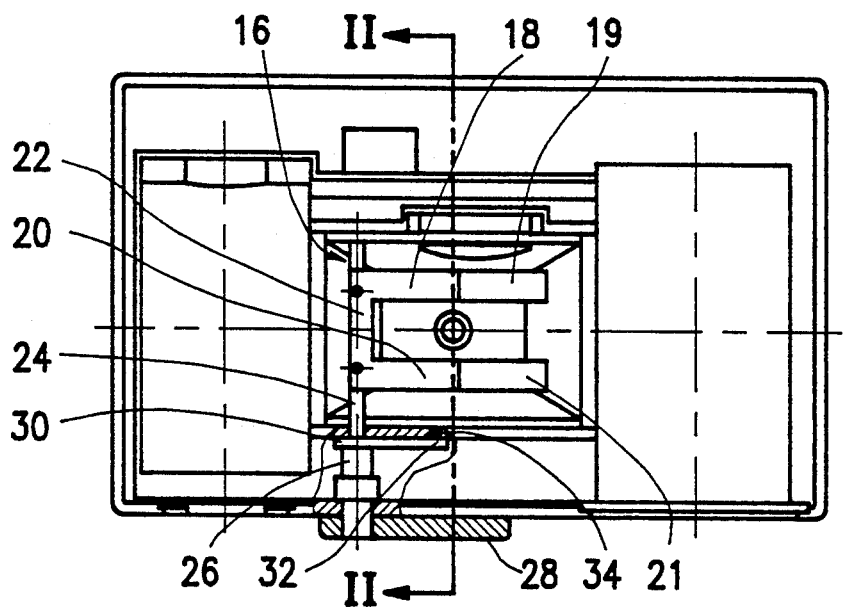
FIG. 2 is a front sectional view of the camera of the present invention taken along section line I—I of FIG. 1.

In FIG. 2, a front sectional view of the camera is illustrated taken along section line I—I of FIG. 1. FIG. 2 shows a front view of the film masking mechanism 14. The film masking mechanism is shown as a single, unitary member having an upper member 18 and a lower member 20. The upper member 18 and the lower member 20 are generally horizontal as the camera is held as shown in the figure. The upper member 18 and the lower member 20 are connected to each other by a connecting element 22 for generally forming, "C" shape. The entire film masking mechanism, comprising the upper and lower members 18 and 20 respectively, and the connecting element 22 are made of flexible, light impenetrable material. This material is preferentially brass, but may be optionally made of steel or plastic. The thickness of the light impenetrable material is preferentially in the range of from about 0.15 mm to about 0.30 mm.

Although the upper and lower members may be entirely made of flexible material, it is preferred that at least a portion of the upper and lower members be flexible. For example, as shown in FIG. 2, the upper member 18 may include a flexible upper element 19 attached thereto and the lower member 20 may similarly include a flexible lower member 21 attached thereto. In either case, it is preferable that the ends of the upper and lower member of the film masking mechanism be flexible so that they may flexibly move out of the exposure area when the film masking mechanism is in position for taking a full size picture.

The film masking mechanism 14 is shown in FIG. 2 as pivotably attached to the camera by means of a shaft 24. The shaft is fixedly connected along its longitudinal axis to a sleeve 26. The sleeve 26 extends outside of the camera and is fixedly attached to an operating element, for example, a lever 28 for actuating the film masking mechanism 14.

Attached to the sleeve 26 is a positioning means. The positioning means is adapted for positively positioning the film masking mechanism in a selected position. The positioning means preferentially comprises an elastic element 30. At the end of the elastic element 30 is located at an engaging means 32. The camera is provided with detents 34. The detents 34 correspond to the selected positions of the film masking mechanism. The engaging means 32 is adapted to releasably engage the detents 34 in the camera for positively positioning the film masking mechanism according to the position selected by the user. By rotating the lever 28, the film masking mechanism 14 may be made to swing about the pivot 16 within the film tunnel 8 and into and out of the exposure area of the film.

Figure 3:
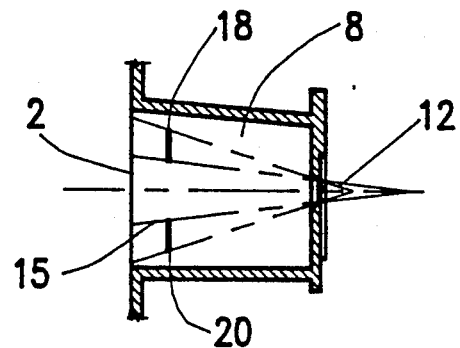
FIG. 3 is a partial side view of the camera of the present invention taken along section line II—II of FIG. 2.

In FIG. 3, a partial side view of the camera is illustrated, taken along section line II—II of FIG. 2. FIG. 3 shows a side view of the film tunnel 8 with the upper member 18 and the lower member 20 of the film masking mechanism 14 in position for creating a panoramic size photograph. As the light enters the aperture 12, a portion of the light is blocked and prevented from exposing the film 2 thus creating an image on the photographs wherein the upper and the lower portion of the photograph are masked and only the central portion of the film is exposed to the light. When the exposed image on the film 2 is enlarged, usually about 7 times, as is well known in the art, a picture having a panoramic effect is produced.

Figure 4:
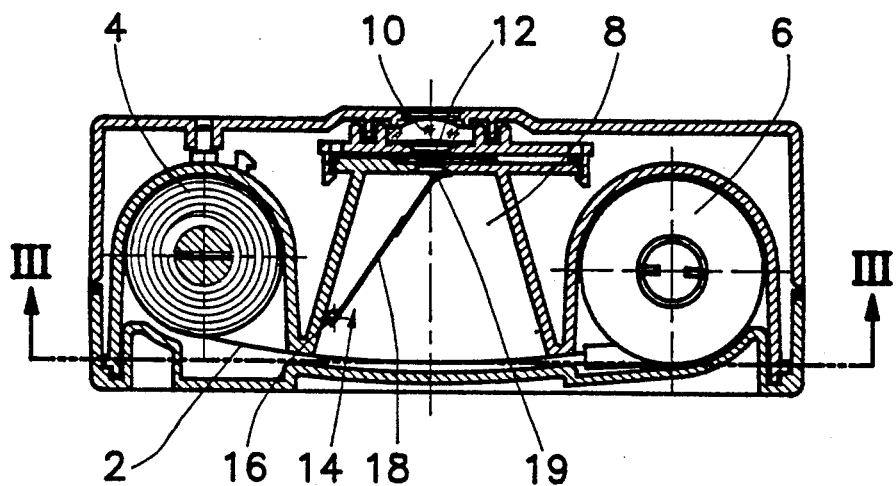
FIG. 4 is a top sectional view of the camera of the present invention showing the masking means in the position for forming full size pictures.

In FIG. 4, the masking means 14 is shown in position for forming a full size picture. As illustrated therein, the film masking means has swung about the single pivot 16. The end portion of the upper member 18 is flexibly moved out of the exposure area so that no portion of the film 2 is blocked or masked and so that a full size picture will be exposed on the film. Preferentially, the flexible upper element 19 attached to the end of the upper member flexes into this position by abutting a portion of an inner wall of the camera within the film tunnel 8. Of course, optionally, if the entire film masking mechanism is constructed of flexible material, then that portion which abuts a portion of the inner wall of the film tunnel, will flex so that a full size picture is exposed on the film.

Figure 5:
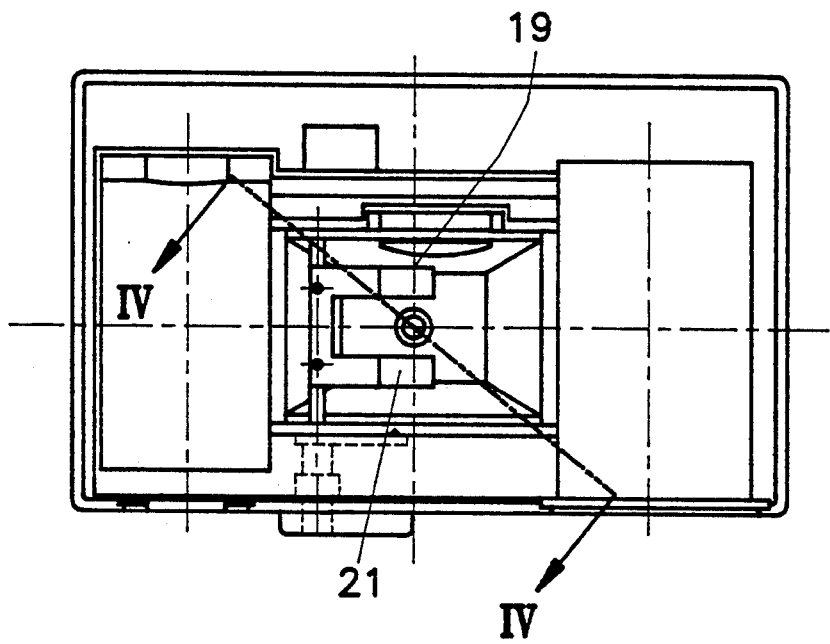
FIG. 5 is a front sectional view of the camera of the present invention taken along section line III—III of FIG. 4.
Figure 6:
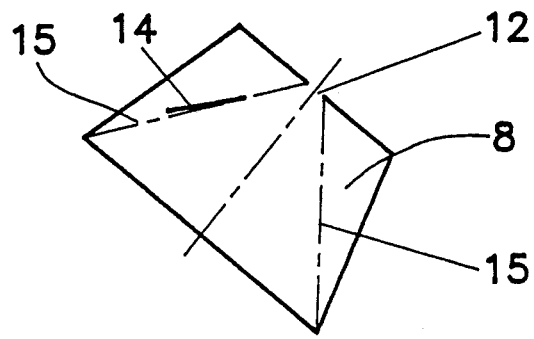
FIG. 6 is a partial sectional view of the camera of the present invention taken along section line IV—IV of FIG. 5 and showing the masking means in the film tunnel in the position for taking a full size picture.

In FIG. 5, a front sectional view of the camera is illustrated taken along section line III—III of FIG. 4. FIG. 6 is a partial sectional view of the film tunnel 8 taken along section lines IV—IV of FIG. 5. FIG. 5 shows a front view of the film masking mechanism 14 and FIG. 6 shows a side view of the film masking mechanism in position for taking a full size picture. As illustrated in these figures, the outer portion (represented as the preferential flexible upper element 19), of the upper member is flexed outside of the exposure area of light 15 of the film tunnel 8. In this way, the film masking mechanism 14 is pivoted in position for taking a full size picture because no portion of the film masking mechanism blocks the line of light passing through the film tunnel.

Figure 7:
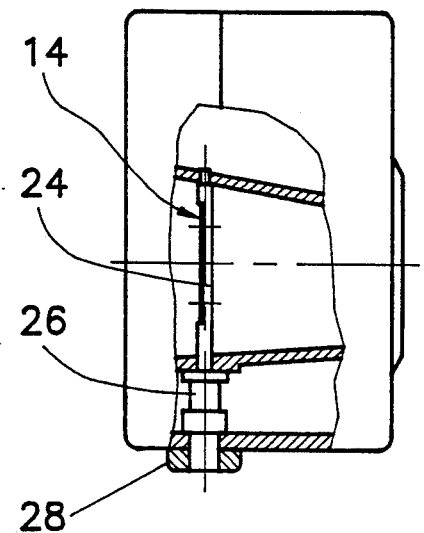
FIG. 7 is a side cut away view of the device of the present invention.

FIG. 7 illustrates a cut-away sectional side view of the film masking mechanism 14. The shaft 24 of the film masking mechanism is shown connected to the sleeve 26. As further illustrated, the lever 28, which is positioned outside of the camera is shown connected to the sleeve 26. By rotating the lever 28 about the longitudinal axis of the shaft 24 and sleeve 28, the film masking mechanism is pivoted between the position for taking full size pictures and the position for taking panoramic pictures.

Figure 8A:
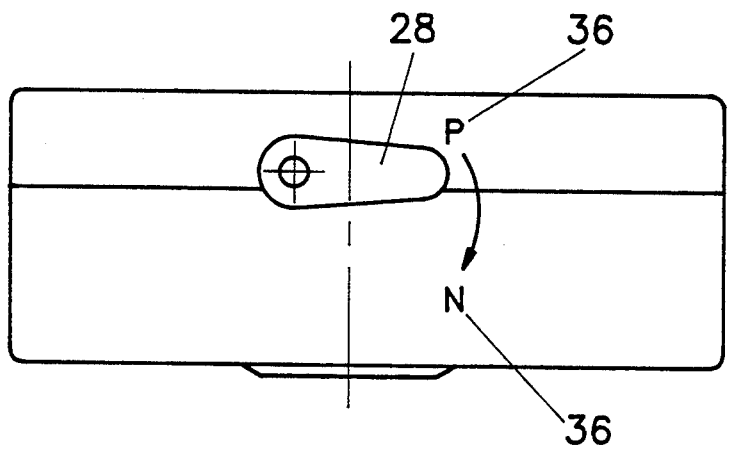
FIG. 8A is a bottom view of the camera of the present invention showing the operating element in the panoramic position.
Figure 8B:
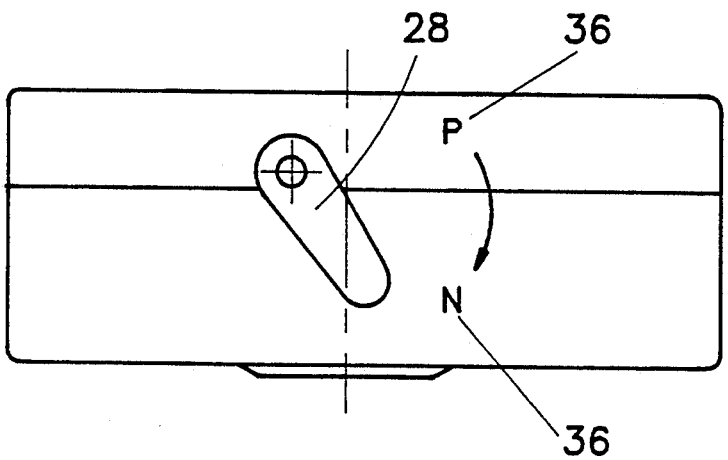
FIG. 8B is a bottom view of the camera of the present invention showing the operating element in the normal full size position.

FIGS. 8A and 8B are illustrations of the lever 28 on the bottom of the camera. FIG. 8A illustrates the lever 28 in position for taking panoramic pictures. FIG. 8B illustrates the lever 28 in position for taking full size pictures. Preferentially provided on the bottom of the camera are positional indicating symbols 36 for clearly indicating to the user the position of the lever 28, and thus, the position of the film masking means within the camera.

In operation, when the user desires to take a full size picture, the lever 28 on the base of the camera is moved into the "N" position as shown in FIG. 8B. This lever preferentially clicks in places by means of the positive positioning means 30. Alternatively, whenever the user desires to take a panoramic picture, the user pivots the lever 28 into the "P" position as illustrated by FIG. 8A. This position is similarly positively positioned by means 30.

Although the particular embodiments shown and described above will prove to be useful in many applications in the photographic arts to which the present invention pertains, further modifications of the present invention herein disclosed will occur to persons skilled in the art. All such modifications are deemed to be within the scope and spirit of the present invention as defined by the appended claims.

What is claimed is:

1. A photographic camera, comprising:

a) an exposure aperture for forming a full size picture frame;

b) masking means for partially masking said aperture for forming a panoramic size picture frame, wherein said masking means operates as a flexible unitary element, wherein said unitary element is adapted for pivoting between a first position so that a picture is formed having the full size frame and a second position so that a picture is formed having the panoramic size frame wherein when said unitary element is in said first position said unitary element is flexibly flexed away from said exposure aperture and when said unitary element is in said second position said unitary element is in a substantially straight unflexed position; and c) actuating means for pivotably moving said masking means between said first position and said second position.

2. The camera of claim 1, wherein said masking means further comprises an upper element, a lower element, and a connection therebetween for generally forming a "C" shape, wherein said upper element is adapted for masking an upper portion of said aperture and said lower element is adapted for masking a lower portion of said aperture for forming the panoramic size picture frame.

3. The camera of claim 2, wherein said upper element comprises a flexible upper member, wherein said lower element comprises a flexible lower member, and wherein said flexible members are adapted to flex so that said masking means is positioned in said first position.

4. The camera of claim 2, wherein at least a portion of said upper element and wherein at least a portion of said lower element are adapted to flex so that said masking means is positioned in said first position.

5. The camera of claim 2, wherein said actuating means comprises an operating element connected to said masking means and positioned on the outside of the camera for operation by the user.

6. The camera of claim 5, wherein said operating element is adapted for indicating the position of said masking means.

7. The camera of claim 6, further comprising a means for positively positioning said masking means in said first position or said second position.

8. The camera of claim 7, wherein said positive positioning means comprises a first detent corresponding to said first position of said masking means, and a second detent corresponding to said second position of said masking means, and wherein said positioning means comprises an elastic element for engaging said detents.

* * * * *